(12) United States Patent
Case

(10) Patent No.: US 6,254,258 B1
(45) Date of Patent: Jul. 3, 2001

(54) SEALED LIGHT FIXTURE

(75) Inventor: Patrick Case, Fresno, CA (US)

(73) Assignee: B-K Lighting, Inc., Madera, CA (US)

( * ) Notice: Subject to any disclaimer, the term of this patent is extended or adjusted under 35 U.S.C. 154(b) by 0 days.

(21) Appl. No.: 09/320,187

(22) Filed: May 26, 1999

Related U.S. Application Data

(60) Provisional application No. 60/086,928, filed on May 27, 1998.

(51) Int. Cl.[7] .................................................... F21V 33/00
(52) U.S. Cl. .......................................... 362/373; 362/294
(58) Field of Search .................................. 362/373, 547, 362/580, 218, 294

(56) References Cited

U.S. PATENT DOCUMENTS

| | | | |
|---|---|---|---|
| 5,291,381 | 3/1994 | Price | 362/248 |
| 5,367,438 * | 11/1994 | Deslandres | 362/61 |
| 5,465,195 * | 11/1995 | Jenner et al. | 362/547 X |
| 5,580,163 | 12/1996 | Johnson | 362/285 |
| 5,676,454 | 10/1997 | De'Armond | 362/275 |
| 5,980,074 * | 11/1999 | Hwang | 362/547 |

* cited by examiner

Primary Examiner—Laura K. Tso
(74) Attorney, Agent, or Firm—Richard A. Ryan

(57) ABSTRACT

A sealed light fixture having a valve mounted in the housing to vent pressure that builds-up inside the housing during operation of the light and to prevent moisture and contaminants from entering the housing. The light fixture automatically creates a vacuum inside the housing to prevent condensation from causing corrosion and other problems for the light fixture. The pressure releasing mechanism permits easy installation of the housing cap and avoids damage to the fixture as a result of temperature caused pressure increases. The valve has a pressure equalizing mechanism that can be manually actuated to eliminate the vacuum and equalize the pressure inside the housing with the atmosphere so the housing can be disassembled and the lamp replaced when necessary.

20 Claims, 3 Drawing Sheets

SEALED LIGHT FIXTURE

CROSS-REFERENCE TO RELATED APPLICATIONS

This application claims the benefit of U.S. Provisional Application No. 60/086,928 filed May 27, 1998.

BACKGROUND OF THE INVENTION

A. Field of the Invention

The field of the present invention relates generally to sealed light fixtures, such as those utilized for outdoor lighting. More specifically, this invention relates to sealed light fixtures that utilize a valve to prevent condensation in the fixture and to vent pressure build-up therein. Even more specifically, the present invention relates to sealed light fixtures having valves that automatically vent pressure build-up in the sealed light fixture to create a vacuum therein that prevents condensation, yet facilitates assembly and disassembly of the light fixture by equalizing the pressure in the fixture with the atmosphere.

B. Background

It is well known that many people use lights, such as spotlights and other types of lights, in outdoor applications. These applications generally require a sealed or near-sealed light fixture to prevent moisture from entering the light housing, lamp or electrical circuit components of the lighting system to prevent damage or injury that can result from moisture contact with an electrical system. The typical outdoor light fixture has a mounting assembly that includes a knuckle joint that attaches to a junction box or other source of electricity, a housing connected to the knuckle joint and a cap connected to the housing to enclose the lamp. Gaskets are typically utilized between the various members of the light fixture to prevent the intrusion of moisture.

Despite the significant operational and safety advantages of using a completely sealed housing, the sealing of the housing makes assembly and disassembly of the light fixture very difficult. In order to assemble the light fixture, the cap must be placed on the housing and locked into place. If the housing is sealed such that the completed assembly will be airtight, the action of placing the cap on the housing compresses the air inside the housing and makes placement of the cap on the housing difficult. Once the cap is in place on the housing, the high internal pressures that exist make locking the cap to the housing very difficult. Brute force or some type of mechanical advantage must be used in order to seal the cap onto the housing. Once the cap is installed, the sealed light fixture must be able to withstand the increased internal pressure that results from the heating of the air inside the fixture when the lamp is on. The problems with utilizing a sealed housing are compounded with larger size light fixtures which generate more heat.

To avoid the problems described above, most light fixtures are manufactured so they are not completely air-tight. These systems have significant disadvantages. Fixtures that are not air-tight have a mechanism to vent the pressures that result from assembling the light fixture and the pressure that results from the heating up of air inside the housing during operation. Generally, the venting is accomplished by making the knuckle joint connector such that it is not air-tight where it connects to the housing. Because it is open to the atmosphere, the knuckle joint or other non-sealing mechanism allows air to vent out of the light fixture during installation and during the heat-up and expansion caused by the lamp being on.

Unfortunately, while the air inside the housing is cooling after the lamp is turned off, outside air is drawn inside the housing as the pressure inside the housing lowers. This drawing in of outside air brings moisture and contaminates that are also in the air (such as salt for installations near salt water) inside the housing. The resulting moisture inside the housing can cause condensation that can result in corrosion and/or problems with the electrical components. To avoid these problems, the internal components must be manufactured out of materials that can withstand corrosion and moisture must be prevented from entering into moisture-sensitive areas. Some manufacturers utilize chemical materials inside the light fixture to absorb the moisture that enters as a result of the above process.

As an alternative to the non-sealed light fixtures described above, some manufacturers of light fixtures create a vacuum inside the lamp housing during the manufacturing process. The vacuum inside the housing solves the problems with moisture and contaminates getting inside the housing and reduces or eliminates the problem with condensation. However, due to the vacuum, the owner of such a light fixture can only replace the lamp by removing the entire lamp housing and shipping it to the manufacturer for replacement. This creates significant difficulty and expense for the system owner.

What is needed is a sealed light fixture having a mechanism for releasing the pressure build-up that occurs during the installation of the cap onto the housing and which results from the temperature increase when the lamp is on, while preventing moisture and contaminates from entering the light fixture after the lamp turns off. The mechanism should also permit the light fixture owner to equalize the pressure inside the housing to allow relatively easy removal of the cap for relamping.

SUMMARY OF THE INVENTION

The sealed light fixture of the present invention solves the problems identified above. Specifically, the present invention discloses a sealed light fixture that utilizes a valve mounted in the housing to vent pressure that builds-up inside the housing and prevent moisture and contaminates from entering the housing. The sealed light fixture having the valve of the present invention automatically creates a vacuum inside the lamp housing to ensure no condensation occurs. Additionally, the light fixture of the present invention has a valve that eliminates the vacuum so that the cap can be removed from the housing to replace the lamp or perform other repair work.

The light fixture of the present invention has a housing that forms a housing chamber that houses the lamp that is used to provide the desired lighting effect. A valve is disposed in an opening that connects the housing chamber with the atmosphere. The valve is configured to release pressure from inside the housing chamber that results from installing the cap on the housing and from the heating effect of the lamp when it is on. In the primary embodiment of the present invention, the valve comprises a one-way check valve with the valve body threaded into the housing opening. Disposed in the valve body is a first spool and a second spool and a valve chamber between the two spools. The first spool has a passageway that interconnects the valve chamber with the atmosphere. The second spool has a passageway that interconnects the valve chamber with the housing chamber. Disposed in the valve chamber is a diaphragm that seats against the second spool. When pressure builds up in the housing chamber, the diaphragm is pushed off its seat and the pressure vents to the atmosphere. After the pressure is released, the diaphragm reseats itself and a vacuum is created inside the housing chamber to prevent condensation.

To facilitate removal of the cap to replace the lamp, the valve assembly includes a pressure equalizing mechanism. In the preferred embodiment, this mechanism utilizes a spring that pushes against the second spool and, as a result, the first spool, a annular chamber between the first spool and the valve body and a relief port located in the valve body. The annular chamber is in fluid communication with the atmosphere and the relief port is in fluid communication with the housing chamber. When the first spool is pushed inward toward the housing chamber against the spring, the annular chamber becomes substantially aligned with the relief port and air flows from the atmosphere to inside the housing chamber. This equalizes the pressure and allows easy removal of the housing cap. When the lamp is turned on, the resulting increase in pressure opens the valve and removes the air and moisture from inside the housing chamber and recreates the desired vacuum condition.

Accordingly, the primary objective of the present invention is to provide a light fixture that provides an easy to use and self-regulating valve for discharging pressure from inside the light fixture and preventing condensation therein.

It is also an important objective of the present invention to provide a light fixture that has a vacuum inside the light fixture housing during operation that can be eliminated when it is necessary to open the light fixture and then automatically recreated when the fixture becomes operational again.

Another important objective of the present invention is to provide a light fixture that automatically discharges pressure that builds up while installing the cap on the housing and as a result of the heat generated by the lamp.

Yet another important objective of the present invention is to provide a light fixture that utilizes a removable pressure releasing and anti-condensation valve.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
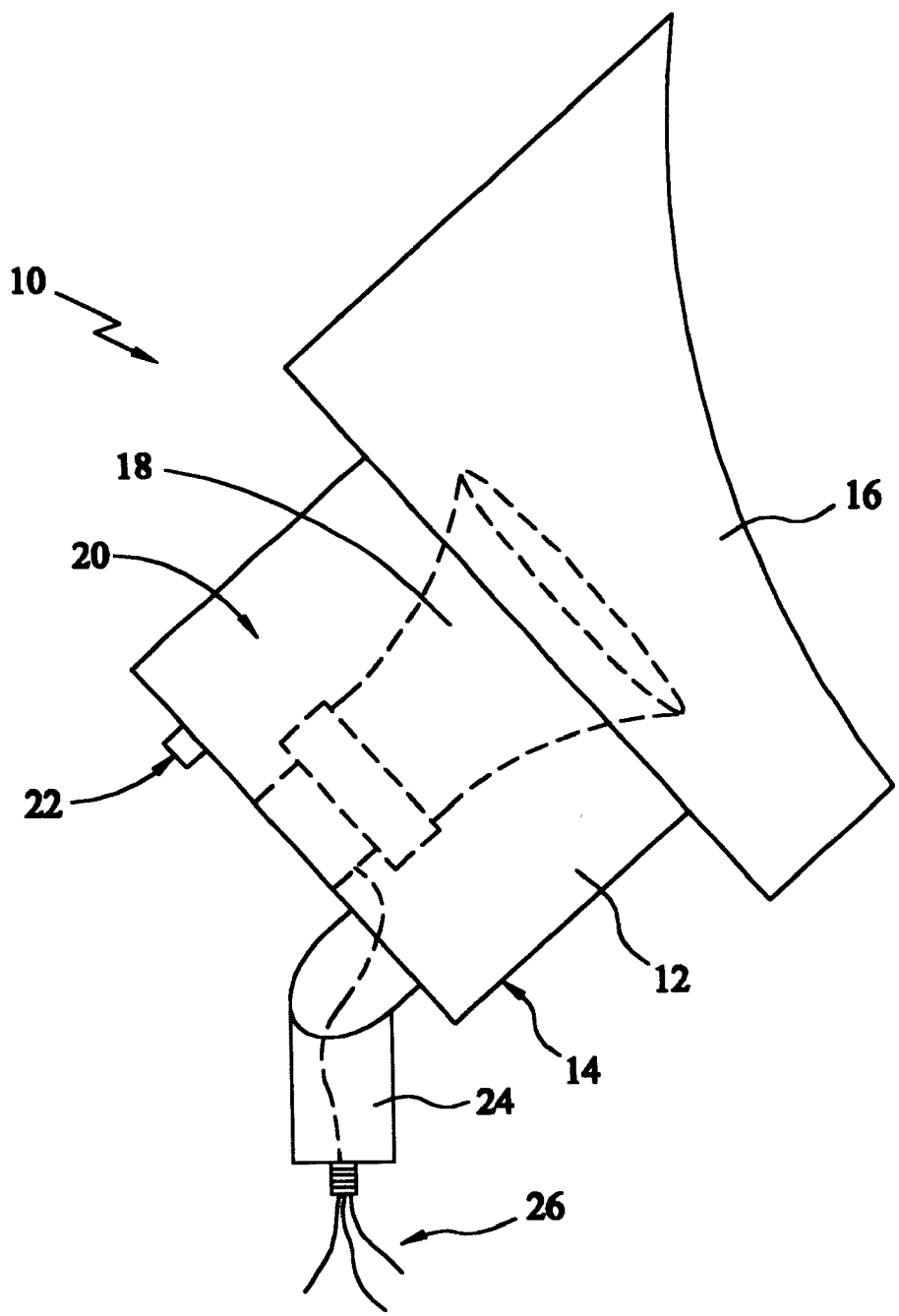
FIG. 1 is a side view of a light fixture of the present invention.

With reference to the figures where like elements have been given like numerical designations to facilitate the reader's understanding of the present invention, and particularly with reference to the embodiment of the present invention illustrated in FIGS. 1 through 2, the preferred embodiment of the present invention is set forth below. The sealed light fixture of the present invention, designated generally as 10, includes housing 12 having a main housing body 14 and a cap 16 that removably attaches to housing body 14 to allow replacement of lamp 18 located inside the housing chamber 20 formed by housing body 14 and cap 16. A valve 22 is shown attached to the bottom side of housing 12, although it could be placed on the side of body 14 or on cap 16. Housing 12 connects to a knuckle joint 24 that allows the angular adjustment of light fixture 10 a and through which the electrical wiring 26 passes. Knuckle joint 24 attaches to a junction box or some other device (not shown) that is suitable for supporting light fixture 10. The lamp 18 is aimed at the location where light is desired.

Figure 2:
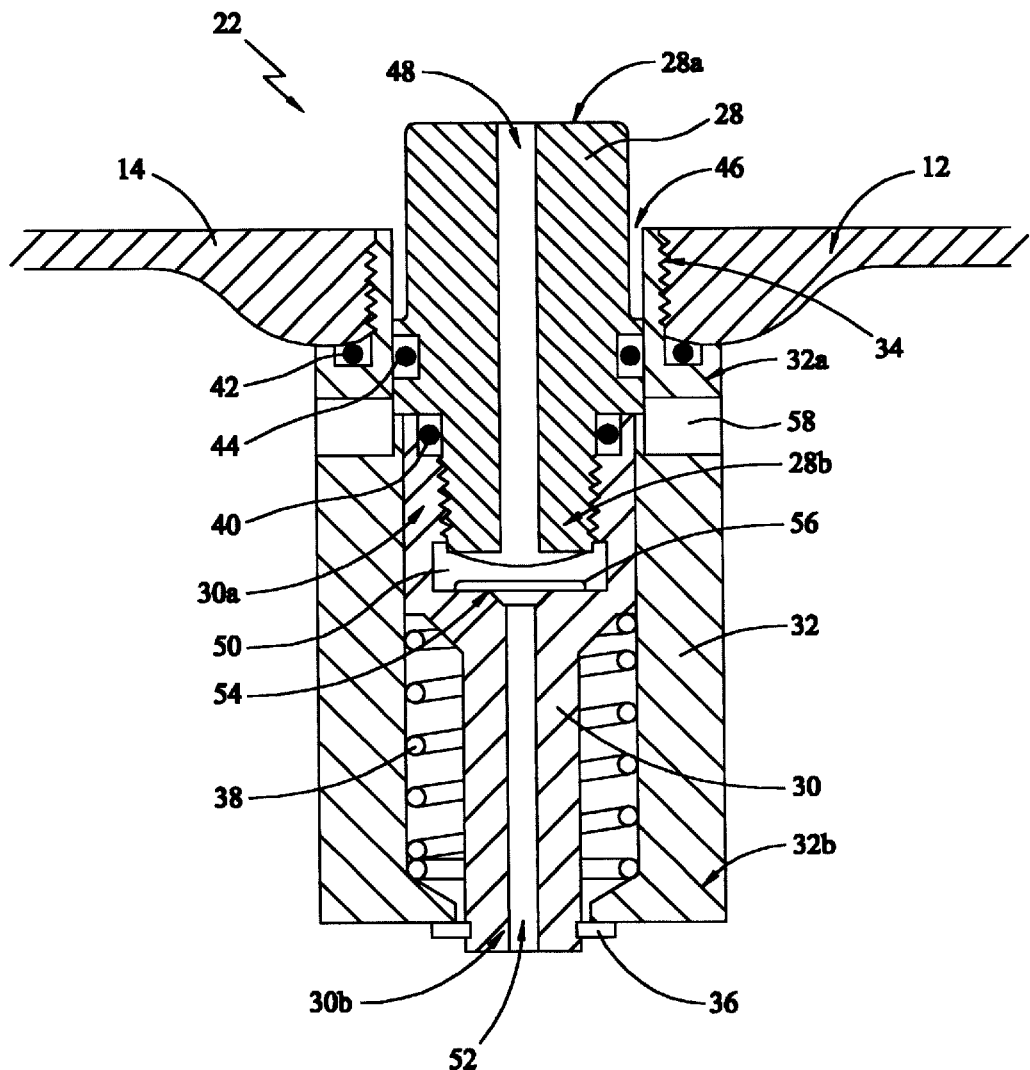
FIG. 2 is a cross-sectional view showing the valve of the primary embodiment located in the interior of a light fixture housing.

The preferred embodiment of valve 22 of the present invention is illustrated with a cross-sectional view in FIG. 2. As shown in FIG. 2, the valve 22 primarily comprises a first spool 28 and a second spool 30 in a valve body 32. First spool 28 has a first end 28a and second end 28b. Second spool 30 has first end 30a and second end 30b. Valve body 32 has first end 32a and second end 32b. In the preferred embodiment, second end 28b of first spool 28 threadably connects to first end 30a of second spool 30 and the externally threaded first end 32a of valve body 32 is threaded into an internally threaded opening 34 in housing 12. The first spool 28 and second spool 30 assembly (collectively, the "spool assembly") are slidably disposed inside valve body 32. A retaining ring 36 located on the second end 30b of second spool 30 prevents upward movement of the bottom of second spool 30 beyond the second end 32b of valve body 32.

A compression spring 38 on the outside of second spool 30 inside valve body 32 (as shown in FIG. 2) is biased against second spool 30 to place a force on the entire spool assembly that is sufficient to keep first spool 28 towards the atmospheric side of housing 12 to prevent unwanted downward movement of the spool assembly. O-ring 40 seals the space between first spool 28 and second spool 30 to prevent passage of fluid between spools 28 and 30 and valve body 16. O-ring 42 seals the valve 22 to housing 12 connection to prevent passage of fluid into housing 12. An additional O-ring 44 seals the annular space between first spool 28 and the inside of valve body 32. Instead of O-rings, various other sealing mechanisms may be used to seal the connections described above to prevent unwanted entry of fluid into housing 12.

In the preferred embodiment, annular chamber 46 is formed by utilizing a first spool 28 having a slightly smaller outside diameter than the opening provided by valve body 32 at the atmosphere side of valve 22. Annular chamber 46 is in fluid communication with the atmosphere. Disposed in first spool 28 is upper passageway 48. First passageway 48 extends through first spool 28, substantially from first end 28a to second end 28b of first spool 28. Upper passageway 48 connects valve chamber 50 to the atmosphere outside housing 12. Disposed in second spool 30 is second passageway 52, which connects housing chamber 20 with valve chamber 50. In the preferred embodiment, first end 30a of second spool 30 comprises or forms valve seat 54 for diaphragm 56, which is suitable for forming a one-way check valve. Diaphragm 56 can be shaped and configured to sealably abut seat 54. Valve body 32 has relief port 58 which is open to housing chamber 20. Upon movement of first spool 28 inward towards housing chamber 20, relief port 58 becomes substantially aligned with annular chamber 46 to interconnect housing chamber 20 with the atmosphere.

In use, valve 22 is threaded into opening 34 that is placed in an otherwise air-tight housing 12 prior to or after shipment of the housing to the user. After valve 22 is threaded into housing 12, housing 12 becomes air-tight or sealed and fluid should not be able to enter housing chamber 20 except through valve 22 as described below. When the user places cap 16 on housing body 14 the pressure build-up inside housing chamber 20 is vented to the atmosphere by entering second passageway 52, displacing and going around diaphragm 56 and exiting through first passageway 48 to the atmosphere. O-ring 40 prevents the air pressure from being relieved through the inside of valve body 32. The venting of the pressure build-up from inside housing chamber 20 allows the user to easily place cap 16 on housing body 14 and lock it into place to form sealed housing 12 for sealed light fixture 10.

The pressure increase of the air inside housing chamber 20 that results from the increase in temperature due to lamp 18 being on is vented, along with any water vapor that may be in housing chamber 20, through the second passageway 52, valve chamber 50 and first 48 passageway to the atmosphere, as discussed above. When lamp 18 is turned off and the pressure drops inside housing chamber 20 due to the decrease in temperature, outside air is prevented from entering housing chamber 20 by the passive diaphragm-type check valve action of diaphragm 56 seating against seat 54. Unlike other systems that utilize a non-sealed housing, moisture and contaminants do not flow into housing chamber during cool down. Because air cannot flow into housing chamber 20, a vacuum is created inside housing chamber 20, which prevents condensation and avoids corrosion and other problems associated with condensation.

The vacuum inside housing chamber 20 prevents anyone from being able to remove cap 16 to replace lamp 18. To allow lamp 18 to be easily replaced valve 22 should include a pressure equalizing mechanism for allowing the user to equalize the pressure inside housing chamber 20 with the atmosphere. In the preferred embodiment, this task is accomplished by utilizing the spring-biased first spool 28. To equalize the pressure, the user need only push on first spool 28 to cause second spool 30 to compress spring 38 towards housing chamber 20. When the entire spool assembly moves inward, O-ring 44 moves beyond relief port 58 until annular chamber 46 is placed substantially adjacent to relief port 58 so housing chamber 20 is placed in fluid communication with annular chamber 46 and the atmosphere. Due to this operation, atmospheric air flows from outside housing 12 to housing chamber 20 to allow the user to easily remove cap 16 from housing body 14. After lamp 18 is replaced, the entire heat-up and pressure relief process is repeated, thereby once again creating a vacuum inside housing chamber 20 to prevent condensation.

Figure 3:
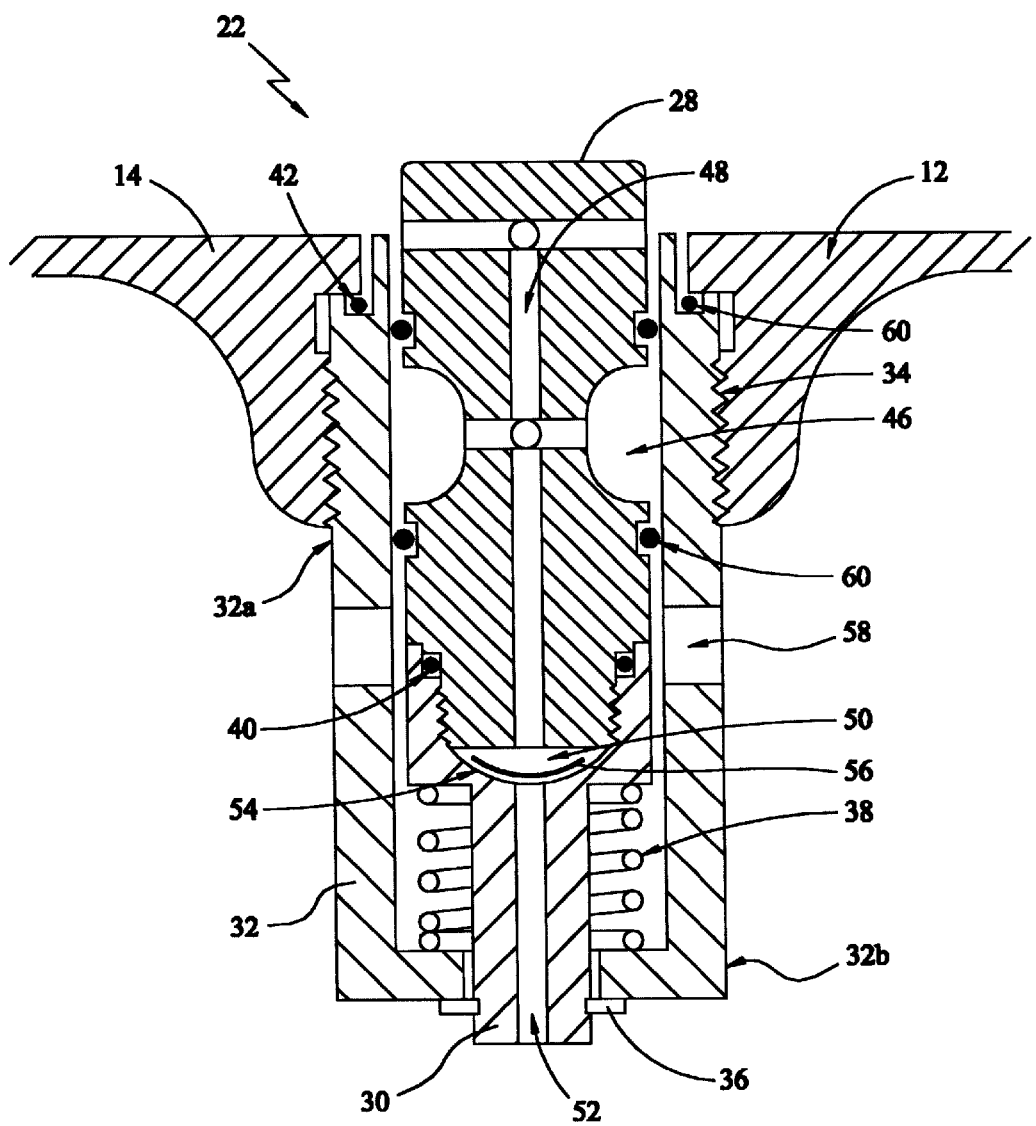
FIG. 3 is an alternative embodiment of the valve in use with the light fixture of the present invention.

The above description is of the preferred embodiment of the present invention. There are numerous components described herein that can be replaced with equivalent functioning components to accomplish the objectives of the present invention. One such modification is shown in FIG. 3, which utilizes a pair of O-rings 60 around a larger annular chamber 46 and a first passageway 28 that has horizontal as well as vertical fluid exit paths. In addition, other types of sealing members, other than O-rings are available. Care should be used in selecting materials for the O-rings or other sealing members to ensure that they will be capable of withstanding the temperatures created inside the housing. The first end 28a of first spool 28 that is pushed to equalize the pressure inside the housing can extend beyond the wall of housing body 14 as shown in FIG. 2 or be flush with or inside the wall of housing body 14.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A sealed light fixture, comprising:
   a housing, said housing forming an air-tight housing chamber therein;
   a lamp in said housing chamber, said lamp electrically connected to a source of electricity;
   an opening in said housing, said opening interconnecting said housing chamber and the atmosphere; and
   a valve in said opening, said valve configured to vent fluid from said housing chamber when said lamp is on so as to form a vacuum in said housing chamber and to maintain said vacuum to prevent fluid from entering said housing chamber when said lamp is off.

2. The sealed light fixture according to claim 1, wherein said valve is removably disposed in said opening.

3. The sealed light fixture according to claim 1, wherein said valve comprises a check valve disposed between said housing chamber and the atmosphere, said check valve allowing fluid flow from said housing chamber to the atmosphere.

4. The sealed light fixture according to claim 1, wherein said valve further comprises:
   a valve body, said valve body having a first end and an opposing second end;
   a first spool disposed in said valve body, said first spool having a first end, an opposing second end and a first passageway through said first spool, said first passageway in fluid communication with the atmosphere;
   a second spool disposed in said valve body, said second spool having a first end, an opposing second end and a second passageway through said second spool, said second passageway in fluid communication with said housing chamber, said second spool operatively connected to said first spool;
   a valve chamber disposed between said second end of said first spool and said first end of said second spool, said valve chamber interconnecting said first passageway and said second passageway; and
   a diaphragm disposed in said valve chamber.

5. The sealed light fixture according to claim 4, wherein said valve further comprises a seal disposed between said first spool and said second spool for preventing passage of fluid through the annular space between said first spool and said valve body and said second spool and said valve body.

6. The sealed light fixture according to claim 4, wherein said valve further comprises a valve seat at said first end of said second spool, said valve seat sized and configured to seat said diaphragm to operatively close said second passageway and prevent fluid flow therethrough.

7. The sealed light fixture according to claim 4, wherein said valve means further comprises a retaining ring at said second end of said valve body.

8. The sealed light fixture according to claim 4, wherein said second end of said first spool is threadably connected to said first end of said second spool.

9. The sealed light fixture according to claim 4, wherein said first spool and said second spool are integral.

10. The sealed light fixture according to claim 1, wherein said valve is threadably disposed in said opening in said housing.

11. The sealed light fixture according to claim 1, wherein said valve further comprises pressure equalizing means for equalizing the pressure in said housing chamber and said atmosphere.

12. The sealed light fixture according to claim 4, wherein said first spool is moveably disposed within said valve body, whereby movement of said first spool allows fluid to flow from the atmosphere to said housing chamber.

13. The sealed light fixture according to claim 11, wherein said pressure equalizing means comprises:

biasing means disposed in said valve body for biasing said first spool toward the atmosphere;

an annular chamber between said first end of said valve body and said first spool, said annular chamber in fluid communication with the atmosphere; and a relief port in said valve body, said relief port in fluid communication with said housing chamber, said relief port to interconnect said housing chamber with said atmosphere when movement of said first spool places said annular chamber substantially adjacent to said relief port.

14. A sealed light fixture, comprising:

a housing, said housing forming an air-tight housing chamber therein;

a lamp in said housing chamber, said lamp electrically connected to a source of electricity;

an opening in said housing, said opening interconnecting said housing chamber and the atmosphere; and a valve in said opening, said valve configured to vent fluid from said housing chamber when said lamp is on so as to form a vacuum in said housing chamber and to maintain said vacuum to prevent fluid from entering said housing chamber when said lamp is off, said valve comprising a check valve disposed between said housing chamber and the atmosphere to allow fluid flow from said housing chamber to the atmosphere, said valve further comprising pressure equalizing means for equalizing the pressure in said housing chamber and said atmosphere.

15. The sealed light fixture according to claim 14, wherein said valve further comprises:

a valve body, said valve body having a first end and an opposing second end;

a first spool disposed in said valve body, said first spool having a first end, an opposing second end and a first passageway through said first spool, said first passageway in fluid communication with the atmosphere;

a second spool disposed in said valve body, said second spool having a first end, an opposing second end and a second passageway through said second spool, said second passageway in fluid communication with said housing chamber, said second spool operatively connected to said first spool;

a valve chamber disposed between said second end of said first spool and said first end of said second spool, said valve chamber interconnecting said first passageway and said second passageway; and a diaphragm disposed in said valve chamber for operatively allowing fluid to flow from said housing chamber to the atmosphere.

16. The sealed light fixture according to claim 15, wherein said valve further comprises a valve seat at said first end of said second spool, said valve seat sized and configured to seat said diaphragm to operatively close said second passageway and prevent fluid flow therethrough.

17. The sealed light fixture according to claim 15, wherein said valve further comprises a retaining ring at said second end of said valve body for retaining said second end of said second spool.

18. The sealed light fixture according to claim 15, wherein said first spool is moveably disposed within said valve body such that movement of said first spool allows fluid to flow from the atmosphere to said housing chamber.

19. The sealed light fixture according to claim 14, wherein said pressure equalizing means comprises:

biasing means disposed in said valve body for biasing said first spool toward the atmosphere;

an annular chamber between said first end of said valve body and said first spool, said annular chamber in fluid communication with the atmosphere; and a relief port in said valve body, said relief port in fluid communication with said housing chamber, said relief port to interconnect said housing chamber with said atmosphere when movement of said first spool places said annular chamber substantially adjacent to said relief port.

20. A sealed light fixture, comprising:

a housing, said housing forming a housing chamber therein;

a lamp in said housing chamber, said lamp electrically connected to a source of electricity;

an opening in said housing, said opening interconnecting said housing chamber and the atmosphere;

a valve body, said valve body having a first end and an opposing second end, said valve body in said opening;

a first spool disposed in said valve body, said first spool having a first end, an opposing second end and a first passageway through said first spool, said first passageway in fluid communication with the atmosphere;

a second spool disposed in said valve body, said second spool having a first end, an opposing second end and a second passageway through said second spool, said second passageway in fluid communication with said housing chamber, said second spool operatively connected to said first spool;

a valve chamber disposed between said second end of said first spool and said first end of said second spool, said valve chamber interconnecting said first passageway and said second passageway;

a diaphragm means disposed in said valve chamber for operatively allowing fluid to flow from said housing chamber to the atmosphere;

biasing means disposed in said valve body for biasing said first spool toward the atmosphere;

an annular chamber between said first end of said valve body and said first spool, said annular chamber in fluid communication with the atmosphere; and a relief port in said valve body, said relief port in fluid communication with said housing chamber, said relief port to interconnect said housing chamber with said atmosphere when movement of said first spool places said annular chamber substantially adjacent to said relief port.

* * * * *